(12) United States Patent
Patino et al.

(10) Patent No.: US 7,224,992 B2
(45) Date of Patent: May 29, 2007

(54) FOUR POLE STEREO HEADSET WITH PUSH TO TALK CAPABILITY IN A DUPLEX RADIO

(75) Inventors: Joseph Patino, Pembroke Pines, FL (US); Audley F. Patterson, Miramar, FL (US); Richard L. Pyatt, Miramar, FL (US); Russell L. Simpson, Miami, FL (US); Sybren D. Smith, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 661 days.

(21) Appl. No.: 10/683,596

(22) Filed: Oct. 10, 2003

(65) Prior Publication Data

US 2005/0079885 A1 Apr. 14, 2005

(51) Int. Cl.
*H04B 7/00* (2006.01)
*H04Q 7/20* (2006.01)

(52) U.S. Cl. ............ 455/518; 455/519; 455/66.1; 455/78; 455/41.1; 379/420.01; 379/420.02; 379/420.03; 379/420.04; 379/55.1; 381/300; 381/309; 381/311; 381/26

(58) Field of Classification Search ............... 455/78, 455/345, 352, 518, 66.1, 519, 41.1; 379/392.01, 379/419, 420.01–420.04, 55.1, 167.14; 381/384, 381/300, 309, 311, 26, 163; 340/572.1, 572.8, 340/426.13, 426.2
See application file for complete search history.

(56) References Cited

U.S. PATENT DOCUMENTS

| 5,118,309 | A | | 6/1992 | Ford |
| 5,625,684 | A | * | 4/1997 | Matouk et al. ........ 379/392.01 |
| 5,790,947 | A | * | 8/1998 | Dieringer .................... 455/345 |
| 5,815,298 | A | * | 9/1998 | Cern ............................ 398/16 |
| 5,825,873 | A | * | 10/1998 | Duncan et al. ............. 379/419 |
| 5,881,370 | A | * | 3/1999 | Pottala et al. ................. 455/78 |
| 6,563,424 | B1 | * | 5/2003 | Kaario .................... 340/572.1 |
| 7,058,384 | B2 | * | 6/2006 | Davies ........................ 455/352 |
| 2004/0160993 | A1 | * | 8/2004 | Ganton et al. ............. 370/537 |
| 2005/0036644 | A1 | * | 2/2005 | Yang .......................... 381/384 |

* cited by examiner

*Primary Examiner*—Matthew D. Anderson
*Assistant Examiner*—Sujatha Sharma

(57) ABSTRACT

A stereo headset (104) with push-to-talk function can be interfaced with a wireless communication device (102) via a connector interface. The connector interface preferably includes a jack at the wireless communication device (102) and a compatible plug at the stereo headset (104). An electrical contact (310) at the connector interface can contemporaneously interconnect both electrical audio signals between the wireless communication device (102) and at least one of the speakers of the stereo headset (104) and electrical user input signals from an external push-to-talk user input device (232) to the wireless communication device (102).

20 Claims, 4 Drawing Sheets

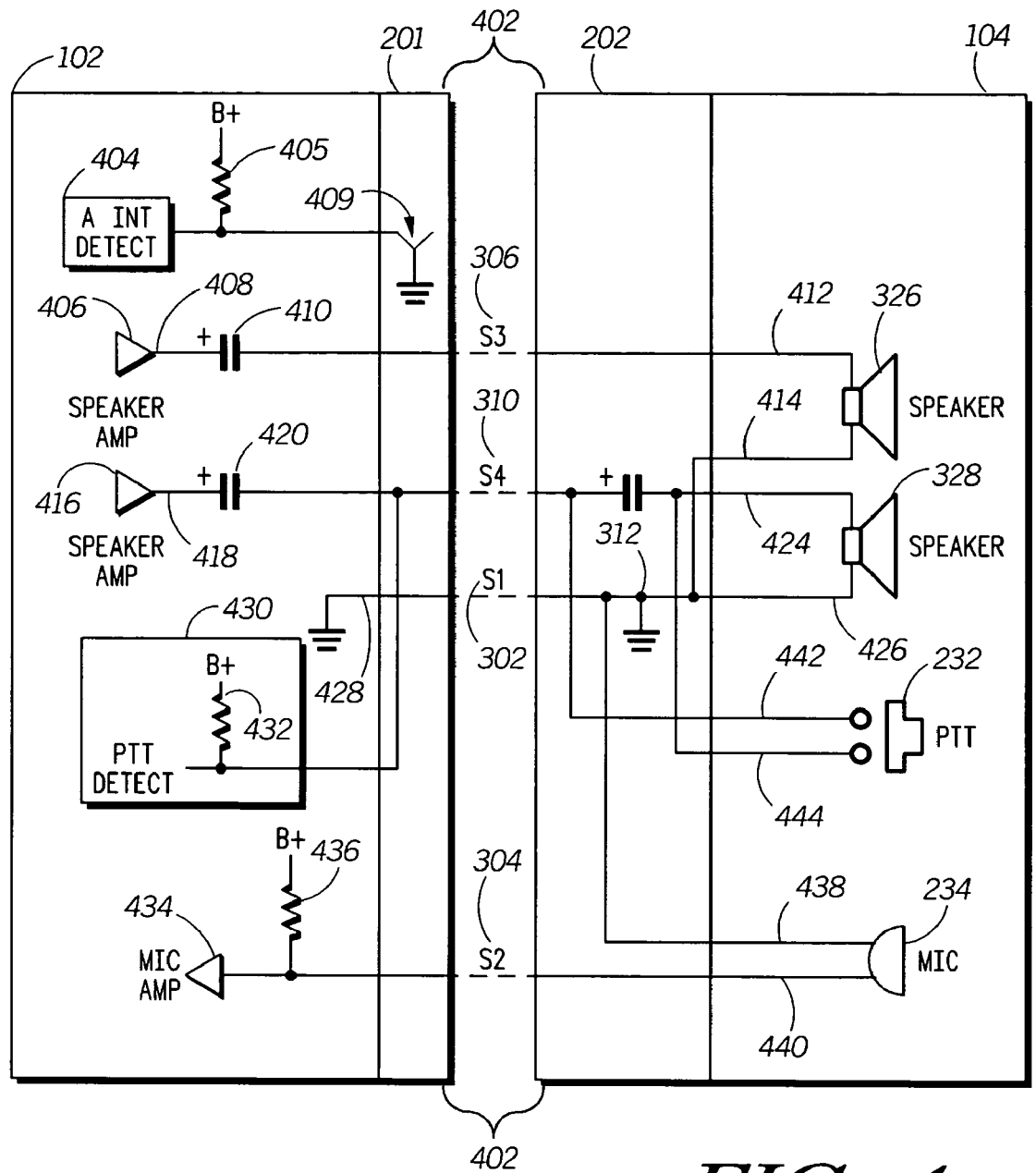
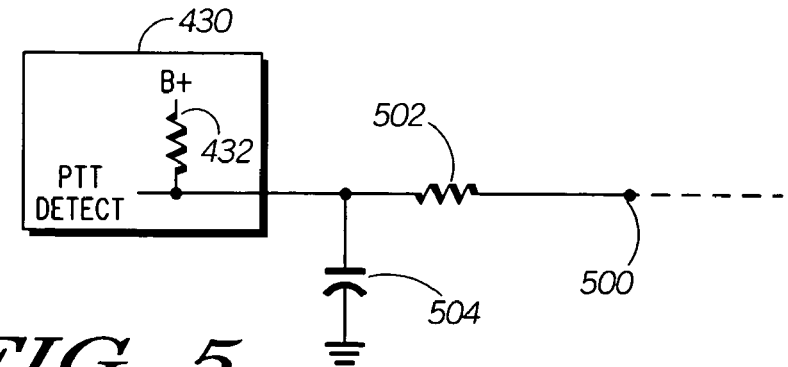
FIG. 4
FIG. 5

FOUR POLE STEREO HEADSET WITH PUSH TO TALK CAPABILITY IN A DUPLEX RADIO

FIELD OF THE INVENTION

The present invention generally relates to the field of headsets for wireless communication devices, and more particularly to a stereo headset with push to talk capability when used with a wireless communication device.

BACKGROUND OF THE INVENTION

Consumers of wireless communication devices, such cellular telephones, demand small, portable, and compact devices. One design feature that provides both functional advantages and such miniaturization and portability benefits is the external audio headset.

A known headset design includes a 4-pole, monaural accessory, with Push-To-Talk (PTT) function. The interface between the monaural headset and the wireless communication device includes one line each for a speaker/earpiece transducer, a microphone, a PTT button, and a common ground reference.

Although modern wireless communication devices are now capable of providing stereo audio output via internal audio speakers in the wireless communication device, unfortunately, there are no known stereo headsets that also include a PTT function on the audio headset for controlling a wireless communication device.

Additionally, in view of the consumer demands for smaller and more compact wireless communication devices, any attempt to increase the number of connector pins at an interface of the wireless communication device, such as to allow both a conventional stereo audio headset and also to add a separate PTT switch control, would not only increase the size and complexity of the interface connectors, at both the wireless device and at the headset, but it would also increase the overall cost of a product to consumers. This type of solution would increase the overall number of connector lines on an interface for both the wireless communication device and the headset. Consumer demands for miniaturization of wireless communication device solutions, and the strong consumer sensitivity to increased product costs, would detrimentally impact the commercial viability of such a wireless communication device solution.

Therefore a need exists to overcome the problems with the prior art as discussed above.

SUMMARY OF THE INVENTION

According to a preferred embodiment of the present invention, an electrical signal interface arrangement comprises an external push-to-talk user input device for accepting user input from a user and providing electrical user input signals representing whether the user has activated the external push-to-talk user input device for controlling a push-to-talk function of a wireless communications device; an external audio transducer for coupling audio with a user, the external audio transducer converting between the audio and corresponding electrical audio signals being coupled with the wireless communications device; and a connector interface comprising an electrical contact that is electrically coupled with the external push-to-talk user input device and the external audio transducer for coupling the electrical audio signals between the electrical contact and the external audio transducer and contemporaneously coupling the electrical user input signals between the electrical contact and the external push-to-talk user input device.

According to another aspect of the present invention, the electrical contact being further for electrically coupling with circuits in the wireless communication device, including a PTT detector circuit for detecting electrical user input signals from the electrical contact, and at least one of an audio output circuit for outputting electrical audio signals to the electrical contact and an audio input circuit for inputting electrical audio signals from the electrical contact.

According to an embodiment of the present invention, the electrical audio signals are substantially AC signals, and the electrical user input signals are substantially DC signals, the AC signals and the DC signals being contemporaneously coupled via the electrical contact.

In one embodiment of the present invention, a stereo headset with push-to-talk function can be interfaced with the wireless communication device via the connector interface. Additionally, the connector interface may preferably include a jack at the wireless communication device and a plug at the stereo headset. In one preferred embodiment, the jack is a five contact, four pole, stereo audio jack, and the plug is a four contact stereo audio plug.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 is a circuit block diagram illustrating a headset with connector lines for interfacing with the wireless communication device, according to an exemplary embodiment of the present invention.

FIG. 5 is a partial circuit block diagram showing a filtered input for a PTT detector, according to an exemplary embodiment of the present invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The present invention, according to a preferred embodiment, overcomes problems with the prior art by multiplexing one line of an interface for a headset with a speaker/earpiece transducer for one channel of a stereo audio signal along with the PTT button by using a DC blocking capacitor. On the same interface line both audio signal (AC signal) for the speaker and PTT control signal (DC signal) can simultaneously operate to provide both functions with a single shared line.

Figure 1:
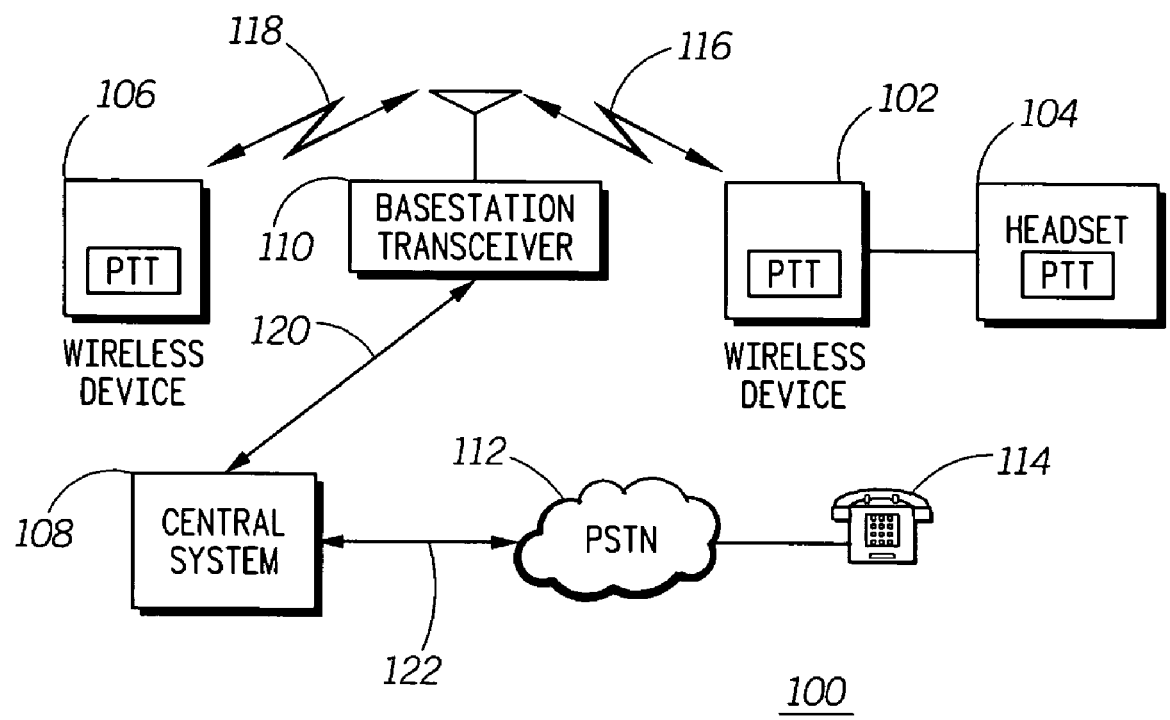
FIG. 1 is a block diagram illustrating a wireless communication system according to a preferred embodiment of the present invention.

Referring to FIG. 1, a wireless communication system 100 comprises wireless devices 102, 106 that communicate across coverage regions covered by one or more basestation transceivers 110 under control of a central system 108, such as available in cellular communication systems and other wireless communication systems, as is well known in the art. The central system 108 may be coupled, and in communication 122 with, one or more communication networks such as the Public Switch Telephone Network (PSTN) 112 that includes phone devices 114 and other terminal devices (not shown) that can communicate with the central system 108. The devices on the PSTN 112 can typically communicate 122 in a full duplex communication fashion. The central system 108 is capable of communicating 120 via the basestation transceiver 110 with the wireless devices 102, 106 that are in communication 116, 118, with the central system 108. A user of a wireless communication device 106, for example, can speak and listen using the wireless communication device 106 to communicate with another user of a separate remote device, such as the wireless communication device 102, or the telephone device 114. Audio communication between such users of the devices 102, 106, 114, can allow for full duplex communication 116, 118, 120, 122 between any plurality of users in the system 100. Users of the wireless communication devices 102, 106, typically use a push-to-talk switch to activate a device transmit mode for a user to speak and have the voice audio transmitted in the system 100. The push-to-talk switch activation will normally activate the transmitter portion of the wireless communication devices 102, 106, and open up audio communication from a microphone on the wireless communication device 102, 106, to allow the user to speak and deliver audio through the wireless communication device 116, 118, and transmitted via the system 100. Similarly, when a user of a wireless communication device 106, for example, is speaking with a user of a remote telephone device 114, the user of the wireless communication device 106 activates the push-to-talk switch to allow transmission of voice audio to the remote user of the telephone device 114.

Conventionally, when a push-to-talk switch was activated on a wireless communication device, the transmission of voice audio typically de-activated the reception of voice audio from a remote device in the system, such that a user could normally only communicate in a simplex audio mode via the communication system. That is, voice audio would either be transmitted from a user of a local wireless communication device, for example, to a user of a remote wireless communication device, or the voice audio of the user of the remote wireless communication device would be received and delivered to the user of the local wireless communication device, but not both. A user would typically only speak while the push-to-talk switch is activated or listen for received audio from a remote device when the push-to-talk switch was released and not active.

In newer wireless communication devices 102, 106, and systems 100, such as modern cellular telephones and systems, full duplex audio is enabled by the technology such that a user of a wireless communication device 106, for example, is able to speak and to listen at the same time and the push-to-talk switch is used merely to activate the transmission circuits of the wireless communication device 106 when appropriate, thereby conserving power to the portable wireless communication device 106. This is a significant consideration for users of wireless communication devices 102, 106. It is well known that the transmitter circuits on a portable wireless communication device 102, 106, consume significantly higher levels of power than the receiver circuits of the same device 102, 106. Additionally, many users are accustomed to activating a PTT switch to transmit spoken audio in wireless communication systems 100. Therefore, at least for the reasons discussed above, the push-to-talk function serves a valuable purpose in wireless communication devices 102, 106, that communicate voice audio in full duplex while operating in a wireless communication system 100.

A wireless communication device 102 may be communicatively coupled with a headset 104 to allow a user to comfortably communicate with the wireless communication device 102, and without having to carry the wireless communication device 102 on the hands. This is especially useful during certain activities that would not permit a user to manually manipulate the wireless communication device 102 while performing such activities. The headset 104 advantageously includes the push-to-talk switch function to allow a user of the headset 104 to activate the transmit mode of audio from the wireless communication device 102, and additionally the headset 104 permits full duplex audio such that the user of the wireless communication device 102, and the headset 104, is able to both speak and listen at the same time. This is a valuable feature of a preferred embodiment of the present invention, as will be discussed in more detail below.

Figure 2:
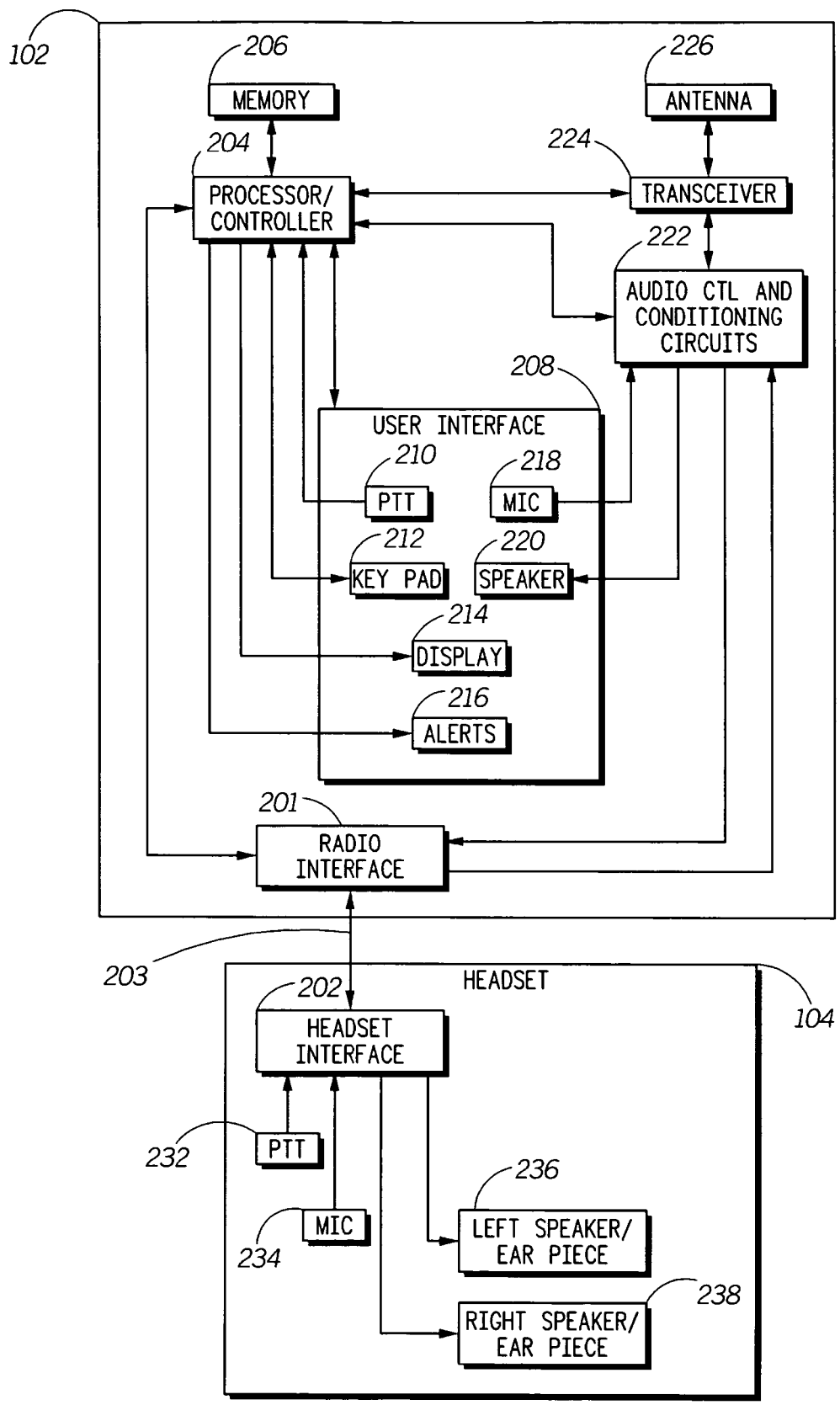
FIG. 2 is a block diagram showing a more detailed view of an exemplary wireless communication device and an exemplary headset of FIG. 1, according to a preferred embodiment of the present invention.

Referring to FIG. 2, a more detailed view of the wireless communication device 102 and headset 104 of FIG. 1 is shown, according to a preferred embodiment of the present invention. The example in FIG. 2 shows the wireless communication device 102 communicatively coupled via an interconnection 203 of a radio interface 201 (at the wireless communication device 102) to a headset interface 202 (at the headset 104). The wireless communication device 102 and headset 104 are also generally shown in FIG. 1. The interconnection 203, according to a preferred embodiment of the present invention, is implemented using a plurality of electrical contacts between a plug (at the headset interface 202) and a jack (at the radio interface 201). In one preferred embodiment, the jack is a five contact, four pole, stereo audio jack, and the plug is a four contact stereo audio plug, as will be discussed in more detail below. However, it will be obvious to those of ordinary skill in the art, in view of the present discussion, that other alternative interconnection arrangements may be used without deviating from the present invention. For example, pins mating with sockets in a connector block interconnection arrangement could be used to interconnect the wireless communication device 102 and the headset 104.

The wireless communication device 102 includes a processor/controller 204 that is communicatively coupled with memory 206. The memory 206 stores software program for the processor/controller 204. The memory 206 also stores configuration parameters and other data that is used by the processpr/controller 204. The memory 206 may include volatile and/or non-volatile memory, such as RAM, ROM, EEPROM, Flash, disc drive or floppy media, DD ROM, and other such memory and storage as is well known in the art. The processor/controller 204 operates according to the software, configuration parameters, and data, that are stored in the memory 206 to provide functions and features in the wireless communication device 102. The processor/controller 204 is communicatively coupled with a user interface 208 to allow a user of the wireless communication device 102 to communicate with, and control, the wireless communication device. In this example, the user interface 208 includes the push-to-talk switch 210 that can accept user input activation from the user of the wireless communication device to enable transmission of audio from the user through the wireless communication device 102 into the system 100. The user interface 208 also includes a keypad 212 that can accept user input such as data and control. The user interface 208 also includes a display 214 for displaying information to the user of the wireless communication device 102. Alerts 216 in the user interface 208 can provide audible alerts, visual alerts, and/or tactile alerts, to the user in a manner well known to those of ordinary skill in the art. Additionally, the display 214 can provide visual indications, e.g., visual status information, visual alert information, etc., to the user of the wireless communication device 102. The user interface 208 also includes a microphone 218 and a speaker (or speakers 220) such that audio can be received from a user of the wireless communication device via the microphone 218 and audio can be provided to the user via the speaker(s) 220. The microphone 218 is communicatively coupled to audio control and conditioning circuits 222 in the wireless communication device 102 such that audio received by the microphone 218 is conditioned and then can be delivered to a transceiver 224 that is coupled to an antenna 226 to wirelessly transmit the audio signal into the wireless communication system 100 destined for reception by, for example, a user of a remote wireless communication device 106 or a user of a telephone device 114 such as shown in FIG. 1. Speaker 220 provides received audio to the user of the wireless communication device 102. A transmitted signal in the system 100 is received by the antenna 226 and coupled to the transceiver 224 which then couples a demodulated audio signal to the audio control and conditioning circuits 222. These circuits 222 condition the audio signal and couple it to the speaker (or speakers) 220 to provide audio to the user. In this way, for example, audio from the user is received by the microphone 218 and transmitted into the system 100, and audio can be received from the system 100 then provided to the user via the speaker(s) 220.

The radio interface 201 to headset interface 202 interconnection 203, according to the present example being discussed with reference to FIG. 2, provides a convenient and modular communication interface between the wireless communication device 102 and the associated headset 104. Audio and control signals are routed via the radio interface 201 to headset interface 202 interconnection 203 to allow the headset 104 to control functions of the wireless communication device 102 as well as to deliver electrical audio signals from a microphone 234 on the headset 104 via the audio control and conditioning circuits 222 to the transceiver 224 and the antenna 226 for transmission into the system 100. Also, received audio signals can be coupled as electrical audio signals from the wireless communication device 102 via the radio interface 201 to headset interface 202 interconnection 203 to the left speaker or earpiece 236 and to the right speaker or earpiece 238 such that the user of the headset 104 can enjoy stereo audio received via the wireless communication device 102. The received audio signals are received via the antenna 226 and the transceiver 224 and then corresponding electrical audio signals are routed to the audio control and conditioning circuits 222. From these circuits 222 the electrical audio signals are then routed, in this example, via the radio interface 201 to headset interface 202 via the interface interconnection 203 and provided to the right and left speakers (or ear pieces) 238, 236 of the headset 104. The structure and function of the radio interface 201, headset interface 202, the interconnection 203, and the exemplary headset 104, will be discussed in more detail below.

Figure 3:
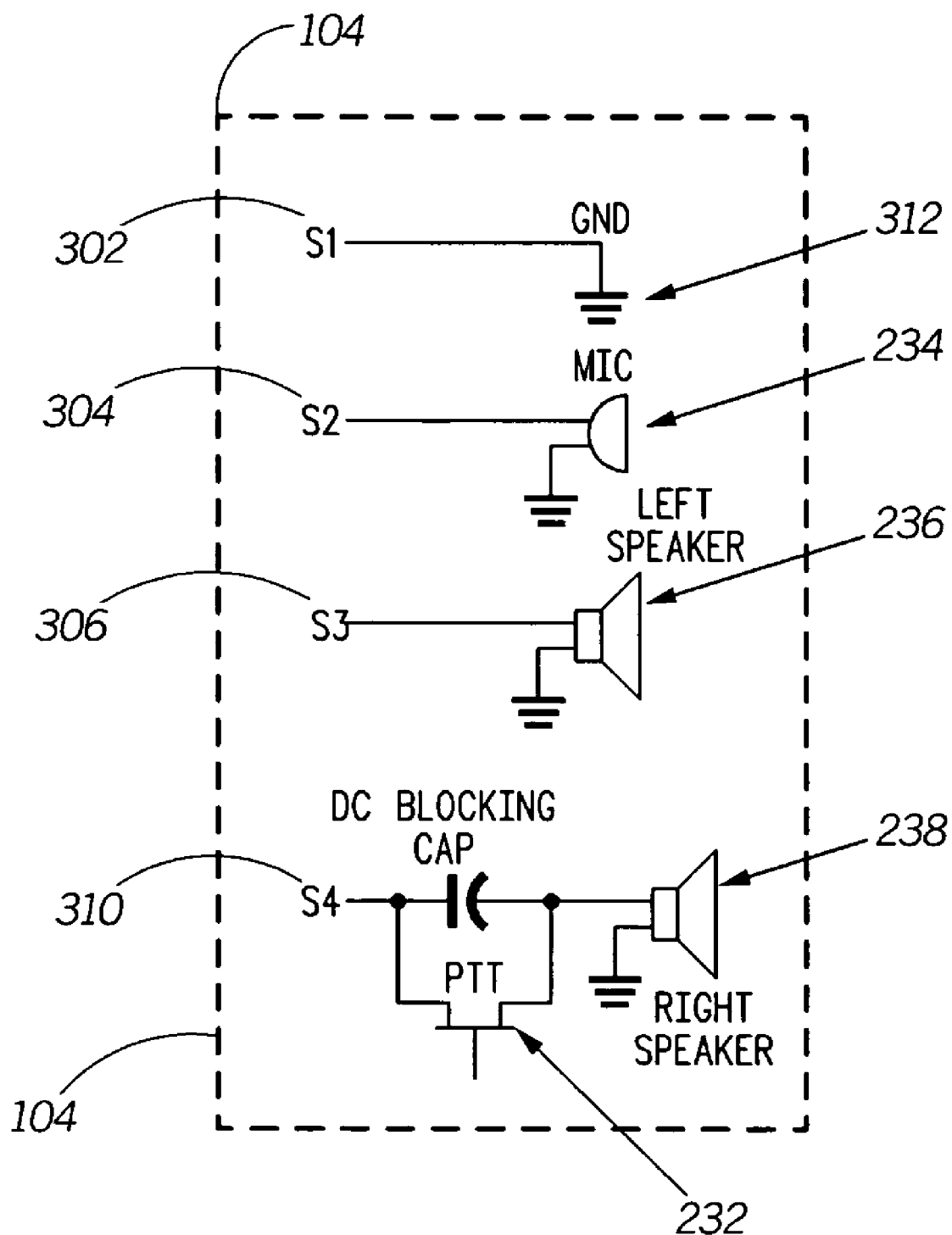
FIG. 3 is a partial circuit block diagram illustrating a headset with connector lines in an exemplary arrangement suitable for use with an interface between the wireless communication device and headset of FIG. 2.

FIG. 3 illustrates a modular view of an exemplary headset 104, as shown in FIG. 2, including a plurality of interface electrical contacts 302, 304, 306, 310, that allow both communication and control signaling between the headset 104 and the wireless communication device 102. According to one embodiment of the present invention, there are four electrical contacts 302, 304, 306, 310, used for a plug for the headset 104. In one preferred embodiment, the plug is a four contact stereo audio plug at the headset interface 202 that is compatible with a jack that, according to an exemplary embodiment, is a five contact, four pole, stereo audio jack, at the radio interface 201. The first electrical contact 302, in this example, provides a ground connection 312. The second electrical contact 304 provides audio coupling for the microphone 234. The third electrical contact 306 provides audio communication for the left speaker 236. The fourth electrical contact 310 provides a dual function for the headset 104 and the wireless communication device 102. This electrical contact 310 allows both audio communication such as for the right speaker 238, as shown in FIG. 3, and also contemporaneously allows user input signaling of the push-to-talk function to the wireless communication device 102 by using a push-to-talk switch 232 on the headset 104. This advantageous feature of the preferred embodiment of the present invention will be discussed in more detail below.

Referring to FIG. 4, a more detailed view of the components of the headset 104 and the wireless communication device 102 are shown, according to a preferred embodiment of the present invention. The plug of the headset interface 202, in this example, is selectively coupled to the jack of the radio interface 201, via the four electrical contacts 302, 304, 306, 310, of the headset interface 202, according a preferred embodiment of the present invention. The exemplary interface interconnection 402, as shown in FIG. 4, will be discuss in more detail below.

First of all, a common ground contact 302 couples the ground 428 on the wireless communication device 102 with the ground reference 312 for the headset 104. The microphone 234, as shown in FIG. 4, has one of its leads 438 connected to the ground 312 and the other lead 440, according to the present example, coupled via the second electrical contact 304 to power (B+) via the pull up resistor 436. The electrical contact 304 additionally provides the audio signal input to the microphone amplifier 434. The third electrical contact 306 couples the output 408 of the speaker amplifier 406 via a capacitor 410 to the driving lead 412 of the speaker 236 which then has the return lead 414 connected to the ground reference 312.

According to the present exemplary interface interconnection 402, the plug and jack mate such that a headset connection indicator 409 can be detected by the wireless communication device 102 as a signal that the headset 104 has been connected (e.g., plugged in) and is available for communication and control of the wireless communication device. The headset connection indicator 409, in this example, provides in the jack of the radio interface 201 a normally closed switch to ground 428, such that when the plug of the headset interface 202 is plugged into the jack of the radio interface 201 the switch connection opens. In such event, a pull up resistor 405 pulls to a high voltage level (near B+) the input of a headset detector 404 in the wireless communication device 102. The headset connection indicator 409, in this example, indicates when the plug is plugged into the jack. That is, the headset detector 404 can detect when the wireless communication device 102 is electrically coupled with the headset 104. In this example, the headset detector 404 detects the signal as an audio headset interrupt signal for the processor/controller 204 to indicate when the headset 104 is first plugged into the wireless communication device 102.

The fourth electrical contact 310 provides a dual function interface for both coupling electrical audio signals, in this example from the speaker amplifier 416 to the speaker 238, as well as providing electrical user input signals from the push-to-talk switch 232 on the headset 104 to a push-to-talk detector 430 in the wireless communication device 102, as will be discussed in more detail below. Note that while in this example, the electrical audio signals are shown being coupled from an audio output circuit 416 at the wireless communication device 102 to an audio transducer 238 at the headset 104, it should be obvious to those of ordinary skill in the art that the electrical audio signals, according to an alternative embodiment of the present invention, could be shown being coupled from an audio transducer 234 at the headset 104 to an audio input circuit 434 at the wireless communication device 102. As an alternative example, if a microphone would be substituted for the speaker 238 and a microphone amplifier would be substituted for the speaker amplifier 416, the electrical audio signals would be coupled from the headset 104 to the wireless communication device 102. Note that, in this alternative example, DC power could be provided to the microphone via a separate circuit (not shown) in the headset 104.

Continuing with the present example, the speaker amplifier 416, at its output 418, couples electrical audio signals via the capacitors 420, 422, to the input lead 424 of the speaker 238 which has a return lead 426 to the ground reference 312. Note that the speaker 238 typically has a very low impedance, such as 32 ohms. The input impedance to the push-to-talk detector 430 and the pull up resistor 432 is relatively large compared with the speaker impedance; therefore, most of the signal from the speaker amplifier 416 is delivered to the speaker 238. The speaker amplifier 416 is AC-coupled to the speaker 238. Note also that the capacitor 422 can be located at the headset interface 202, or alternatively can be located at another location in the headset 104, such as next to the speaker 238. When the push-to-talk switch 232 is activated at the headset 104, the two leads 442, 444, of the push-to-talk switch 232 will be connected together. This in turn bypasses the capacitor 422. The impedance of the speaker 238 is very low as compared to the input impedance of the push-to-talk detector 430 and the pull up resistor 432. Therefore, when the push-to-talk switch 232 is activated the DC ground signal from the ground reference 312 will travel through the speaker 238 and around the capacitor bypass 422 and be present at the input of the push-to-talk detector 430. This DC signal when near ground potential indicates to the push-to-talk detector 430 that the push-to-talk switch 232 has been activated. At the same time that the near ground potential DC signal at the input to the push-to-talk detector 430 indicates that the push-to-talk switch 232 has been activated, the AC signal provided by the speaker amplifier 416 through the capacitor 420 is coupled to the speaker 238 to provide audio out of the speaker 238. Simultaneously both DC control electrical signals from the push-to-talk switch 232 to the push-to-talk detector 430 can be present on the fourth electrical contact 310 contemporaneously with electrical audio signals from the speaker amplifier 416 as AC signals being delivered to the speaker 238 to provide audio to the user out of the speaker 238. When the push-to-talk switch 232 is released the DC potential at the input to the push-to-talk detector 430 will be pulled up by the resistor 432 to near the B+ level thereby indicating that the push-to-talk signal has been removed, that is, the push-to-talk switch 232 is now inactive. In this example, although the audio headset connection detector 404 is preferably implemented using an interrupt input signal detection at the detector 404, the push-to-talk detector 430 is preferably implemented using a polled input signal such that the push-to-talk detector 430 can monitor its input line when necessary. Other alternative implementations of signaling for the detectors 404, 430, can be used as should be obvious to those of ordinary skill in the art in view of the present discussion.

According to a preferred embodiment of the present invention the fourth electrical contact 310 can couple at the same time the audio signal (which is an AC signal) from the speaker amplifier 416 to the speaker 238 and the push-to-talk control signal (which is a DC signal) from the push-to-talk switch 232 to the push-to-talk detector 430. The presence of the AC signal on top of the DC signal at the input to the push-to-talk detector 430 normally should not be a concern. However, to further insure that there is no false signaling at the input of the push-to-talk detector 430 due to the presence of the AC signal on top of the DC signal, an RC attenuating filter can be added, such as shown in FIG. 5. Note that the signal line 500 leading to the input of the push-to-talk detector 430 is now coupled via a resistor 502 and a capacitor 504 that provide further attenuation to the AC signal present from the speaker amplifier 416 while not substantially affecting the DC signal from the push-to-talk switch 232 controlling the push-to-talk signal detection by the detector 430. An example of a selection of RC filter components for an exemplary application will be discussed below. Additionally, in software, the processor/controller 204 can monitor the input to the push-to-talk detector 430 and provide software filtering, or de-bouncing, to avoid interference of the detection of the push-to-talk signal (DC signal) due to the presence of the audio signal (AC signal).

To address a possible concern about the PTT line 310 being misread (DC signal) due to audio signal (AC signal) swing on the PTT line 310, an RC filter can be added to dampen any AC signal swing at the input of the PTT detector 430. Additionally, software, such as stored in the memory 206, can operate the processor/controller 204 to debounce the input of the PTT detector 430 to further alleviate this possibility of AC signal interference in the operation of the PTT detector 430. As an example, as illustrated in FIG. 5, a series resistor of 200 Kohm 502 with a capacitor 504 of 0.1 uF on the PTT line 500 will dampen an AC signal at 250 Hz by a factor of roughly 31. So, even if any electrical audio signal present on the line 500 is, say, 3 V peak-to-peak, after the RC filter, at the input to the PTT detector 430 the AC signal swing will be less than 100 mV peak-to-peak. Since a PTT detector 430, according to one example, using logic gates senses a low signal at a voltage threshold of (0.3) (2.775V) or 0.8325V, and since a pull up resistor 432 and a series resistor 502 to PTT input may be selected at 100K and 10K, respectively, (which corresponds to a typical value of (2.775V)(10K)/(10K+100K)=0.2523 V), adding 100 mV swing to 0.2523V is still well below a maximum allowable low voltage threshold of 0.8325V. In other words, an AC signal swing on the PTT line 310 can be effectively attenuated by an RC filter to substantially avoid falsing at the input of the PTT detector 430 due to the electrical audio signals (i.e., being coupled to the speaker 238) sharing the same electrical contact 310 as the input to the PTT detector 430.

Lastly, in the event that a conventional stereo headset is connected with e.g., "plugged into", the wireless communication device 102, the wireless communication device can advantageously disregard any PTT signal (DC signal detected by the PTT detector 430 in error) due to this interconnection. Specifically, upon a signal from the headset connection detector 404 that the wireless communication device 102 has been initially connected to a headset, the wireless communication device 202 can immediately monitor the PTT detector 430. If, immediately upon inerconnecting the headset with the wireless communication device 102, the PTT detector 430 detects that a PTT switch is activated, then this condition indicates that the headset is not compatible with external PTT switch detection. (A new operation of a PTT switch activation signal detection is shared with a stereo speaker audio signaling line on the same interface, such as the electrical contact line 310 shown in FIG. 4.) This condition may occur, for example, if the DC blocking capacitor 422 is not present in the electrical contact line 310, such as when electrically coupled with a conventional stereo headset. In such an event, the wireless communication device 102 advantageously ignores any apparent external headset activation of a PTT switch detected by the PTT detector 430, and only allows detection of an internal PTT function (not shown) inside the wireless communication device 102. Such internal PTT function is implemented, for example, by receiving user input via the user interface 208 (e.g., PTT switch 210 shown in FIG. 2) in the wireless communication device 102. In this way, the wireless communication device 102 may operate PTT with the headset 104, according to a preferred embodiment of the present invention, and will additionally be protected from a user inadvertently plugging into the wireless communication device a conventional stereo headset (without PTT function) that could potentially falsify a PTT activation signal.

An exemplary embodiment of the present invention, as has been discussed above, advantageously provides a stereo audio headset 104 that interfaces with a wireless communication device 102 and can communicate Push-To-Talk control signals while allowing full duplex stereo audio communications preferably sharing an electrical contact line 310 of the interface interconnection 402, and advantageously with a reduced number of electrical contact lines at the interface interconnection 402. A reduced number of lines in an exemplary arrangement of the interface interconnection 402 allows physically smaller connectors, and reduces overall product costs, at both the wireless communication device 102 and the stereo headset 104. This is a significant advantage of a preferred embodiment of the present invention that is not found in any known prior art.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An electrical signal interface arrangement, comprising:
   an external push-to-talk user input device external to a wireless communications device, the external push-to-talk user input device for accepting user input from a user and for providing electrical user input signals representing whether the user has activated the external push-to-talk user input device for controlling a push-to-talk function of the wireless communications device;
   an external microphone external to the wireless communications device, the external microphone for converting audio from a user to corresponding electrical audio signals and for coupling the electrical audio signals with the wireless communications device; and
   a connector interface comprising an electrical contact, the electrical contact electrically coupled with the external push-to-talk user input device and with the external microphone, the electrical contact for coupling the electrical audio signals from the external microphone to the connector interface and for contemporaneously coupling the electrical user input signals from the external push-to-talk user input device to the connector interface,
   wherein the electrical contact is further electrically coupled with circuits in the wireless communication device, including:
   a PTT detector circuit, and
   an audio input circuit for receiving electrical audio signals from the electrical contact.

2. The electrical signal interface arrangement of claim 1, wherein the electrical contact is further for contemporaneously electrically coupling:
   the electrical user input signals between the external push-to-talk user input device and the PTT detector circuit for detecting in the wireless communication device whether the user has activated the external push-to-talk user input device; and
   the electrical audio signals between the external microphone and the audio input circuit.

3. The electrical signal interface arrangement of claim 2, wherein the external push-to-talk user input device and the external microphone are part of a stereo audio headset with a push-to-talk user input function.

4. The electrical signal interface arrangement of claim 2, wherein the connector interface includes a five-contact, four-pole, stereo audio plug, and wherein the stereo audio plug, the external push-to-talk user input device, and the external microphone are part of a stereo audio headset with a push-to-talk user input function.

5. The electrical signal interface arrangement of claim 2, including means for disregarding a signal present at the PTT detector circuit due a stereo headset that lacks a push-to-talk user input function being connected to the wireless communication device through the connector interface.

6. The electrical signal interface arrangement of claim 1, wherein the audio input circuit comprises a microphone audio signal amplifier.

7. The electrical signal interface arrangement of claim 1, wherein the electrical audio signals are substantially AC signals, and wherein the electrical user input signals are substantially DC signals, the AC signals and the PC signals being contemporaneously coupled with the electrical contact.

8. A stereo audio headset with push-to-talk function for use with a wireless communication device, the stereo audio headset comprising:

an external push-to-talk user input device for accepting user input from a user and for providing electrical user input signals representing whether the user has activated the external push-to-talk user input device for controlling a push-to-talk function of a wireless communications device;

an external audio transducer for coupling audio with a user, the external audio transducer converting between the audio and corresponding electrical audio signals being coupled with the wireless communications device; and a connector interface including a DC blocking capacitor, the connector interface comprising an electrical contact, the electrical contact electrically coupled with the external audio transducer through the DC blocking capacitor and with the external push-to-talk user input device, the electrical contact for coupling the electrical audio signals between the connector interface and the external audio transducer and for contemporaneously coupling the electrical user input signals between the connector interface and the external push-to-talk user input device, such that when the external push-to-talk user input device is activated, the DC blocking capacitor is bypassed.

9. The stereo audio headset of claim 8, wherein the electrical audio signals are substantially AC signals, and wherein the electrical user input signals are substantially DC signals, the AC signals and the DC signals being contemporaneously electrically coupled via the electrical contact.

10. The stereo audio headset of claim 9, wherein the electrical contact is for contemporaneously electrically coupling:

the electrical user input signals between the external push-to-talk user input device and a PTT detector circuit in the wireless communication device for detecting in the wireless communication device whether the user has activated the external push-to-talk user input device; and the electrical audio signals between the external audio transducer and at least one of an audio output circuit and an audio input circuit, in the wireless communication device.

11. The stereo audio headset of claim 10, wherein when the DC blocking capacitor is bypassed, a near-ground-potential DC signal is produced at an input of the PTT detector circuit, thereby indicating that the push-to-talk switch has been activated while contemporaneously coupling the electrical audio signals between the connector interface and the external audio transducer.

12. The stereo audio headset of claim 8, wherein the connector interface includes sufficient electrical contacts for the stereo audio headset providing full duplex audio communication between a user and the wireless communication device, and the stereo audio headset contemporaneously providing to the user control of a push-to-talk function in the wireless communications device.

13. A wireless communication device comprising:

a connector interface comprising an electrical contact for electrically coupling electrical user input signals with an external push-to-talk user input device and contemporaneously electrically coupling electrical audio signals with an external audio transducer;

a PTT detector circuit for detecting the electrical user input signals from the external push-to-talk user input device;

at least one of an audio output circuit for outputting electrical audio signals to the external audio transducer and an audio input circuit for inputting electrical audio signals from the external audio transducer, the electrical contact for electrically coupling the electrical user input signals and the electrical audio signals, wherein the electrical audio signals are substantially AC signals, and wherein the electrical user input signals are substantially DC signals, the AC signals and the DC signals being contemporaneously coupled via the electrical contact; and means for preventing false signaling at the push-to-talk detector circuit due to the presence of electrical audio AC signals on top of electrical user input DC signals.

14. The wireless communication device of claim 13, wherein the connector interface includes a five-contact, four-pole, stereo audio jack, and wherein the electrical contact is one contact of the five-contact, four-pole, stereo audio jack.

15. The wireless communication device of claim 14, wherein the external audio transducer is one of a plurality of audio speakers of a stereo headset with push-to-talk function, the outputted electrical audio signals being coupled via the electrical contact to one of the plurality of audio speakers.

16. The wireless communication device of claim 15, wherein the audio output circuit comprises an audio signal amplifier and the external audio transducer is one of a plurality of audio speakers, the outputted electrical audio signals being coupled via the electrical contact from the audio signal amplifier to one of the plurality of audio speakers.

17. The wireless communication device of claim 13, in which the means for preventing false signaling includes an RC attenuating filter at an input of the PTT detector circuit.

18. The wireless communication device of claim 13, in which the means for preventing false signaling includes software stored in memory and a processor for monitoring an input of the PTT detector circuit and for providing debouncing of combined electrical user input signals and electrical audio signals at the input of the PTT detector circuit.

19. The wireless communication device of claim 13, including means for disregarding a signal present at the PTT detector circuit due a stereo headset that lacks a push-to-talk user input function being connected to the wireless communication device through the connector interface.

20. The wireless communication device of claim 19, including a headset connection detector, and in which the means for disregarding disregards the signal at the PTT detector circuit when the signal at the PTT detector circuit occurs at approximately at a same time as the headset connection detector detects that the headset is initially connected to the wireless communication device.

* * * * *